United States Patent [19]

Schoon

[11] Patent Number: 4,870,498

[45] Date of Patent: Sep. 26, 1989

[54] DECOMPRESSING RUN-LENGTH-ENCODED TO TRANSITION-ENCODED FONT IMAGE INFORMATION IN AN IMAGE GENERATOR

[75] Inventor: David J. Schoon, St. Paul, Minn.

[73] Assignee: Printware, Inc., St. Paul, Minn.

[21] Appl. No.: 96,961

[22] Filed: Sep. 15, 1987

[51] Int. Cl.[4] ............................................. H04N 1/413
[52] U.S. Cl. .................................. 358/261.4; 358/261.1
[58] Field of Search ...................... 358/133, 260, 261.1, 358/261.2, 261.3, 261.4, 280

[56] References Cited

U.S. PATENT DOCUMENTS

| | | | |
|---|---|---|---|
| 4,149,145 | 4/1979 | Hartke et al. | 358/133 |
| 4,364,037 | 12/1982 | Walker | 358/133 |
| 4,516,173 | 5/1985 | Abe et al. | 358/261.4 |
| 4,610,027 | 9/1986 | Anderson et al. | 358/260 |
| 4,646,356 | 2/1987 | Anderson et al. | 358/260 |
| 4,694,357 | 9/1987 | Rahman et al. | 358/135 |

FOREIGN PATENT DOCUMENTS

| | | | |
|---|---|---|---|
| 2127516 | 4/1982 | Fed. Rep. of Germany | 358/261.1 |
| 56-117479 | 9/1981 | Japan | 358/280 |
| WO83/01696 | 5/1983 | PCT Int'l Appl. | 358/280 |

*Primary Examiner*—James J. Groody
*Assistant Examiner*—Randall S. Svihla
*Attorney, Agent, or Firm*—Dressler, Goldsmith

[57] ABSTRACT

Transition-encoded information for a single scan line of a font image consists of flags at the addresses of all points of transition upon the scan line from black to white, and from white to black, in order to generate one scan line of the font image. This information is produced, scan line by scan line, in a system receiving the vertical position, the horizontal position, and a starting address within a font memory whereat a run-length-encoded description of a particular character font is stored. This information is developed by adding, in an adder, the initial horizontal displacement plus, in a cumulative fashion, the run-length-encoded font information for each character which appears, in some portion, upon an individual scan line. The transition-encoded information is used to control pixel by pixel image generation in an image generator equivalently to full bit-mapped control but with lower cost, higher speed of conversion, and greater flexibility in the images generated.

13 Claims, 4 Drawing Sheets

DECOMPRESSING RUN-LENGTH-ENCODED TO TRANSITION-ENCODED FONT IMAGE INFORMATION IN AN IMAGE GENERATOR

REFERENCE TO RELATED PATENT APPLICATIONS

The present patent application is one of three patent applications by the same inventor filed on an even date and assigned to the same assignee. The present U.S. Pat. application for DECOMPRESSING RUN-LENGTH-ENCODED TO TRANSITION-ENCODED FONT IMAGE INFORMATION IN AN IMAGE GENERATOR teaches the use of conventional, run-length-encoded, font image information to generate, by a process called decompression, a corresponding new type of information called transition-encoded information. This transition-encoded information represents every black-to-white, and every white-to-black, transition, and the pixel locations of each of these transition, which are undergone by selective pixels upon a single scan line. A font image is generated as the synthesis product of many successive scan lines.

Companion U.S. Pat. application Ser. No. 096,960, for IMAGE GENERATION FROM TRANSITION-ENCODED FONT INFORMATION teaches the use of this particular new type of information—which information regards the transitions, and the pixel locations of transitions, from both white to black, and from black to white, which are undergone along and upon a scan line—in order to generate a font image.

Finally, companion U.S. Pat. application Ser. No. 096,959 for COMBINATION OF TRANSITION-ENCODED FONT INFORMATION FOR GENERATION OF SUPERIMPOSED FONT IMAGES teaches a manner of combining transition-encoded information in order to simultaneously image a plurality of superimposed font images. It is especially taught how to combine transition-encoded information for certain pixel points at which both transition-encoded font images simultaneously indicate a white to black (or a black to white) transition.

The three related patent applications are collectively concerned with the generation, use, and special combining for use, of a particular new form of encoding image information—transition-encoded font image information—in and by an image generator device, nominally a printer. The contents of the aforementioned companion patent applications are incorporated herein by reference.

BACKGROUND OF THE INVENTION

Field of the Invention

The present invention generally relates to image generation hardware, particularly including printers and most particularly including non-impact printers. The present invention is concerned with a generation of a particular new form of encoded information—transition-encoded font image information—which is used in the generation of a font image. The manner by which this new information is so used for font image generation will be explained somewhat simplistically in the present specification. A more sophisticated teaching of the preferred manner of image generation transpiring from the selfsame identical transition-encoded font image information is particularly taught in each of the companion patent applications. However, for purposes of understanding the present invention it is only necessary to simplistically understand the use of transition-encoded information in the generation of images.

The present invention is particularly concerned with what, exactly, this new form "transition-encoded" information is, and how it is derived. It will be shown that the new form "transition-encoded" information is derived by transforming, in and by a new process called "decompression", certain conventional run-length-encoded font image information. Both the run-length-encoded information which is "decompressed", and the "transition-encoded" information into which it is "decompressed", represent the images of characters and of character fonts which are generatable by an image generator. The reason that the transformation, or "decompression", which is the subject of the present invention and of this disclosure is performed is because run-length-encoded information is not directly usable to control the marker of an image generator, whereas this new form transition-encoded font information into which the run-length-encoded information is efficiently transformed will be shown to be highly effective for controlling the marker, in real time, to actually generate the image of a particularly chosen character at a particularly chosen font.

Description of the Prior Art

An image generator is a device which receives information, nominally in ASCII form, from a computer, a computer terminal, or other such device. The image generator interprets such information in order to effect a pixel by pixel monochrome or color control of a marking device. For example, an image generator may be within a printer. For example, the pixel by pixel monochrome control may be effected by an on/off control of a raster-scanned marking device such as a laser light beam.

During the course of image generation, the image generator, nominally a printer, needs to, and will, transform, or "decompress", certain high-level encoding, such as the ASCII encoding, representing the characters and the character fonts to be imaged (printed), into the more detailed notational encodings which represent the actual font images of each character to be printed. The actual font image information may be represented by bit map (raster scan) data, run length encoded raster scan data, or by outline format (similar to pen plotter format) data. These detailed encodings are the information which is actually used, in real time, to control the marking device of the image generator. For example, a certain single ASCII encoding always represents an "a". The image generator will transform this ASCII "a" into an image represented in a certain font; for example, block "a" or an italic "a" or an inverse color "a" or literally thousands of particular ways of generating the font image of an "a" (all of which font images are recognizable to the human brain as an "a"). Each of these different images, although all are "a", has an associated detail encoding, unique from all other detail encodings.

A commonly used prior art form of such detailed encodings is bit-map encoding. A grid matrix of the image area is created. Within this grid area the presence, or absence, of a marking at each intersection of the grid in a formation of an image of a particular character of a particular font is represented by the presence, or absence, of a binary bit within a data store, or map, for that particular character and font.

The transformation, or decompression, of information encodings involved in bit-mapped image generation normally transpires as follows. When the device controlling an image generation inputs a character, for example, the ASCII encoded letter "a", then the image generator determines from internally stored information what some particular certain image of an "a" looks like in some particular font. Usually there is a pixel map stored in the image generator memory which "maps out" those pixels for which the marking device will be caused to be "on" and those for which it will be caused to be "off" during the generation of a particular font image for a particular character, thereby generating the desired white and black image of the character. The user normally additionally specifies a font type, font size, and various other information in order to select amongst many alternative ways of representing the same character, for example the small letter "a" as printed in many fonts (Roman, Italic, etc.) at many sizes, slants, boldness levels, etc.

Depending on the resolution, a substantial amount of memory space can be tied up in the bit mapped specification of each font. For example, if the resolution is 300×300 dots (or pixels) per inch (dpi), then a 12 point character (1/6" high) requires 1500 bits (30×50) of information. If the resolution is 1200×1200 dpi, then 24K bits of information are required. For one complete font alphabet of 128 characters, over 3 megabits of information are required for the bit-mapped image representations of these 128 characters. Typically it is desired to have many fonts available simultaneously. The present industry trend is towards higher resolution and more fonts. This often results in memory requirements which are difficult, if not totally impractical. Some prior art image generation systems use hard discs for bit-mapped font image information storage. However, these systems run slower than certain prior art systems which store bit-mapped font image information in semiconductor random access memory (RAM) because of the longer access time of disk memory as compared to semiconductor RAM.

It is also known in the prior art to store font image information either in Programmable Read Only Memory (PROM), or on a disk, in a compressed mode. However, this compressed font image information is always fully "blown up" into full bit-mapped data in RAM. This bit-mapped information means that one bit of storage is required for each pixel of information on the page. In some image generators, the page to be printed is assembled on a pixel by pixel basis before it is printed. This is referred to as a "full bit map" system. It is quite flexible, but the cost is high.

A second problem with bit-mapped image generation systems occurs because of the trend towards higher densities and more fonts. It is currently desired to place characters at any position within an image area (on the page)—including in overlapped positions—without regard to where any other character might be placed. One way of doing this is to have a very fast and very capable microprocessor system place the information for each character in a large RAM. However, this adversely takes a lot of processing time while the printer engine sits idle and while the programmer sits impatiently as this information is being assembled.

The present invention generally deals with the transformation, or decompression, of a particular type of font information, called run-length-encoded font information, upon all such times as a font is directed to be imaged, or printed. Run-length-encoding of information regarding visual images, including the visual images of fonts, is known in the prior art. Run-length-encoded information is simply a recording of the number of pixel elements which are between each transition from white to black, or from black to white, within a single horizontal "scan" line, one of many scan lines which in composite make up the font image. This one type of run-length-encoded font information was, theretofore the present invention, decompressed into bit-mapped font image information.

The present invention will instead decompress run-length-encoded font image information into a new type of information, without direct correspondence in the prior art, which will be called transition-encoded font image information. The transition-encoded font image information will control the pixel by pixel generation of each scan line within a font image equivalently as the prior art bit-mapped font image information did alternatively control such pixels to generate the scan lines and the font image.

SUMMARY OF THE INVENTION

1. The Environment of the Present Invention, and its Relationship to Certain Other Inventions Within Related Patent Applications The present invention is embodied in an image generating system, nominally a printer, which uses a particular new format of information in the generation of a visually discernible font image. This new format of information useful in image generation is called transition-encoded information. It is derived by a transformation, or decompression, of run-length-encoded information concerning font images.

The image generating system in accordance with the present invention is conventionally commanded by a computer or the like. The system is commanded as to which particular character at which particular font (at which particular size, slant, density, etc.) should have its associated run-length-encoded font image information decompressed in order that, responsively to this decompressed information, the image generator should generate the appropriate font image of the appropriate character. The image generating system is also commanded as to where within the image area the font character image should be placed.

When so directed to generate a particular one of large number of characters at a particular one of a large number of fonts, the image generating system in accordance with the present invention will decompress certain appropriate run-length-encoded information in order to produce, at one time, only so much transition-encoded information as controls the generation of one scan line. Subsequent decompressions of still further run-length-encoded information will permit the generation of subsequent scan lines, and will ultimately permit the generation of the entire font image. Thus the transition-encoded font information is transitory within the ongoing operation of the image generating system of the present invention. Therefore, it might alternatively be considered that the present invention is a system for the real-time generation of raster scanned images immediately, but indirectly, from run-length-encoded information without the necessity of forming bit maps (from any information source). Instead of these bit maps, the marker of the image generating system will be controlled in generation of the image by an intermediary form of information called transition-encoded information.

2. Summary of a First Related Invention Usefully Understood for Understanding the Present Invention The present invention concerns what transition-encoded information is, and how it is derived. The motivation as to why such information should be derived is partially visible in the present specification, but some advantages of use of transition-encoded font information are most apparent in the previously-identified related patent applications. Suspending for the moment the subject of the present invention as to how transition-encoded font information is derived, a summary of a first related patent application regarding a use of transition-encoded information is given in the following two paragraphs in order that the motivation for the present invention, hereinafter summarized in the next section, may be better perceived.

U.S. patent application Ser. No. 096,960 teaches, in full sophistication, how transition-encoded information (once derived) may (then) be used to effect control of an image system marker, for example, a laser beam, which is generating an image. It is within this related application taught that transition-encoded information is preferably emplaced in two parallel random access memories (RAMs). For example, consider each RAM as 16K ×1. When there are less than 16K pixels in one scan line then there is one-to-one correspondence between pixels upon the scan line and addressable memory cells within each RAM. Envision each RAM as initially containing all 1's. Now in the first RAM, a flag, say a "0", is stored at the point of every transition upon the scan line from white to black. And, in the second RAM, a flag, say a "0" again, is stored at the point of every transition upon the scan line from black to white. These flags, and the addresses at which they are stored, constitute transition-encoded information. This transition-encoded information can be recorded in any order. The number of bits which are changed is equal to the number of transitions in the scan line (a number which is far less than the number of pixels). The process of making and recording this information is the process of the present invention (to which discussion will be returned to in the second following paragraph), and occurs independently of the image generation process.

During the generation (e.g., the printing) of a scan line both RAM's are simultaneously read. An address counter supplies the address for both RAMs, and this counter counts sequentially at the pixel clock rate. Every time the first RAM outputs a zero, a flip-flop is set to "black". Every time the second RAM outputs a zero, the flip flop is reset to "white". The state of the flip-flop is used to control the black, or the white, generation of successive pixels upon the scan line. For example, the flip-flop may control a laser beam to be "on" or "off", respectively generating white or black pixels in a positive image-generating system such as a video display unit, or respectively generating black or white pixels in a negative image-generating system such as electrostatic printer wherein the laser beam discharges selected areas of a photoconductive surface. Albeit oversimplified, as will be discerned from discussion of that refinement to transition-encoded data generation and use which is presented in copending U.S. patent application Ser. No. 096,959 this is the basic format of transition-encoded information and its basic use for generating pixels upon a scan line.

Summary of the Present Invention

The present invention concerns what transition-encoded information is (by definition), and how transition-encoded information is derived by transformation, or decompression, of run-length-encoded information. Run-length-encoded font image information does not use one piece of information for every pixel in the font image, but rather uses one piece of information for every transition. In this aspect it is quite different from bit-mapped information (into which it is often converted in the prior art) and is actually more similar to the transition-encoded information into which it is converted by the present invention taught within this disclosure.

Run-length-encoded font information contains the incremental distance between white/black transitions in the font image. For example, for a given character in a given font, the information might be interpreted as (1) there are 11 pixels from the left margin of the character box to the first transition, which is white to black; (2) then there are 22 additional pixels of black, (3) then 13 more pixels of white, (4) then 8 more pixels of black, and (5) that is the end of that character. It is common practice to store font information in PROM or on disk in such a run-length-encoded form. Usually the amount of information required is smaller than the required otherwise, especially when the resolution is very high. Run-length-encoded information may fairly be described as "compressed".

Image generation cannot transpire directly from this compressed run-length-encoded information. However, transition-encoded information may be quickly and efficiently produced from run-length-encoded information, and this transition-encoded information may be used for image generation as explained in the immediately previous Section 2. This production is called "decompression" because the transition-encoded information occupies more memory, albeit for but a short and temporary time during the generation of one scan line, than the run-length-encoded information from which it is derived.

The decompression of run-length-encoded information into transition-encoded information is done quickly and efficiently in a hardware system which runs "automatically" once a small amount of initial information has been supplied to it. Particularly, the hardware decompression system receives (i) the vertical position, (ii) the horizontal position, and (iii) a starting address in a font memory whereat a run-length-encoded description of a particular character font is stored (which image line is, in rudimentary form, a single line of print). The decompression system develops the transition-encoded information for a one scan line, of which scan lines an image line will normally contain many, at one time.

The transition-encoded information for each scan line is basically developed by adding, in an adder, the initial horizontal displacement address plus, in a cumulative fashion, the run-length-encoded font information for each character which appears, in a portion of such character, upon that scan line. The vertical position information is used to identify which characters within an image line may have portions within a particular one scan line of such image line. For example, the lower case character "a" may be generated using only roughly the lower half of these total scan lines which combinatorially generate a single image, or "print", line capable of showing both upper and lower case characters. Finally, certain counters, holding registers, and control codes make certain that the decompression of run-length-encoded data in order to generate successive scan lines of transition-encoded data is properly sequenced.

Collective Objects of the Related Inventions

It is one object of the collective inventions within the three related patent applications to achieve full bit-mapped performance, but at a cost and complexity far below that of a full bit mapped system. Still further, it is the objective of the three inventions to improve the processing speed over that speed otherwise available except at very high cost. This cost performance improvement is obtained because the image generator hardware system will perform "intelligent" operations which might usually be associated with the capabilities of, and operations performed by, a microprocessor.

Particular Objects of the Present Invention

It is one particular object of the individual present invention to efficiently and quickly transform, or decompress, run-length-encoded font information stored within a RAM into a new, non-bit-mapped, format of information called transition-encoded font information. This transition-encoded font information is usable to control the white or black generation of each pixel upon each scan line produced by an image generator. The transformation, or decompression, will be sufficiently efficient and quick when implemented with commonly available integrated circuit components so as to allow imaging (printing) on the order of 8 pages per minute (PPM) at 600 dots per inch (DPI) vertical resolution and 1200 DPI horizontal resolution, or 2 PPM at 2400 DPI vertical resolution and 1200 DPI horizontal resolution.

It is the further particular object of the individual present invention that the efficient and quick transformation, or decompression, of run-length-encoded font information into transition-encoded font information used for image generation is without any substantial limitations upon the numbers of fonts—ranging to over 1000—and the types of fonts—including logos, signatures, bar codes, pictographs and pictures as well as alphanumeric characters—which can be generated on demand at sizes from 4 to 255 points. In other words, speed of imaging within the present invention is not purchased at the cost of either the complexity nor of any functional limitations regarding the diverse image generated.

It is a further particular object of the individual present invention that transition-encoded font information should be used to control the generation of successive black or white pixels within a raster scan line at high speed. Particularly, 1200 pixel dots per inch (DPI) will be placed across a horizontal scan line of greater than 8.5 inches within a time period of less than 1100 microseconds (1/900 second) by the use of only common, readily available, integrated circuit components. All control of the marking is from the transition-encoded font information which is decompressed, in real time, from run-length-encoded information.

DESCRIPTION OF THE PREFERRED EMBODIMENT

The present invention resides within an image generator, or processor, which is nominally used as an intelligent controller for a non-impact, laser, printer. The image generator, and present invention, can be used for generating images which are not printed, such as those appearing on a video display unit. The image generator uses real-time raster scan techniques in accordance with the present invention and related inventions to create typeset quality images of 1200 horizontal × 1200 vertical dots per inch (DPI) at the rate of four 8-½"×11" pages per minute (PPM). At such resolution and speeds the image generator must supply pixel by pixel information to turn the image marker—a laser beam—"on" and "off" at speeds up to 35 MHz. The present invention and related inventions allow accomplishment of this high speed control without requiring those very large amounts of high speed, and expensive, memory which would be required by prior art full bit mapped raster scan techniques.

Some rationale for the approach by the present invention and related inventions is as follows. As discussed in the Background of the Invention section, a bit-mapped representation of an entire image line uses considerable amounts of high speed and expensive random access memory (RAM). An image line is of variable height dependent upon the type of font and the font height (from 4 to 255 points) being represented, and is nominally 8.6 inches in width. An image line is normally comprised of a large number of horizontal scan lines. Thus it might be investigated if RAM requirements could be reduced by bit-mapping at the scan line, as opposed to the image line, level. For the 8.6" wide image area, and at 1200 dpi, there are 10,320 pixels in each scan line. A straightforward approach would be to try to prepare a bit-mapped RAM storage wherein each address is one pixel and wherein a stored "1" represents black while a stored "0" represents white. This turns out to be a brute force approach to producing the information needed to control the pixel by pixel, black and white, generation upon a scan line. Moreover, at high pixel rates of scan line generation there is insufficient time, at least when using common integrated circuit semiconductor components, to prepare an approximate 10,320 addresses of bit-mapped RAM storage during an approximate 1100 microsecond generation of each scan line. The present invention and related inventions use an alternative approach to the prior art bit-mapped control of pixel generation.

Figures 1, 2:
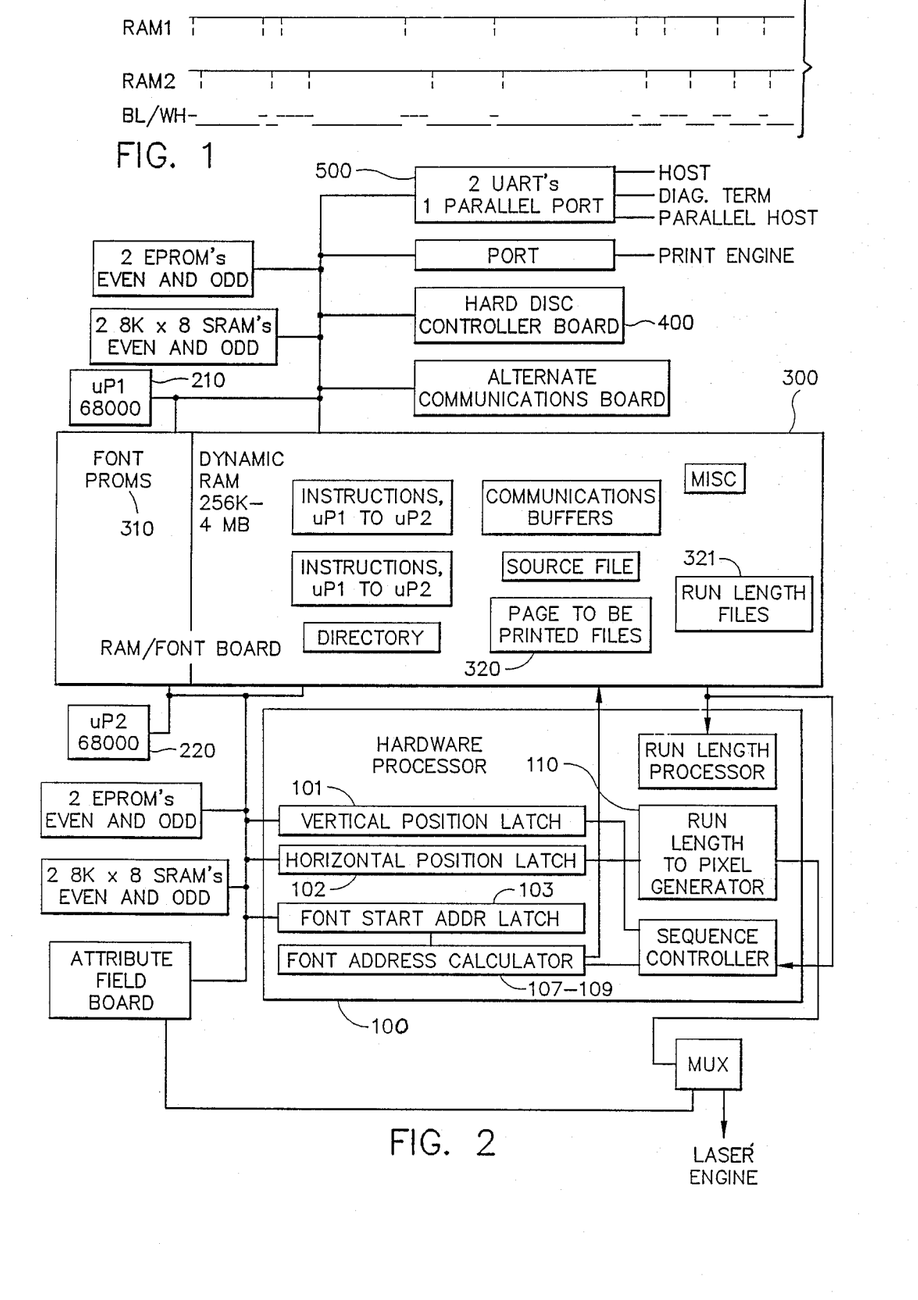
FIG. 1 shows a representation of the control of an image system marker by transition-encoded information in accordance with the present invention.
FIG. 2 shows a block diagram of an image processing system including an image generator hardware processor wherein the present invention resides.

In this alternative approach a memory space of 16,384 pixels (10,320, plus unused extras) is mapped out twice; once for white-to-black transition points, and a second time for black-to-white transition points. The representation of this mapping is shown in FIG. 1. Although one physical RAM could be mapped two time—once with a first-type flag at white-to-black transition points and again with a second-type flag at black-to-white transition points—it has been found that the use of two parallel RAM's is advantageous. The black-to-white transitions are recorded in a nominal first random access memory RAM1, and the white-to-black transitions are recorded in random access memory RAM2. Within FIG. 1 the left-to-right extension of the lines at RAM1 and RAM2 represent the memory addresses (10,320+) of each random access memory while the vertical "tick marks" represent the relative locations within each random access memory whereat the flags are stored.

Observing FIG. 1, the convention is employed that each RAM is initially written to all 1's, (shown as a high level) and each transition indicated by a "0" (shown as a low-going spike). It may immediately be recognized that information is not required to be written into the RAMs for every pixel. All that is necessary is to determine whether each transition within run-length-encoded font information represents black-to-white or white-to-black, and to insert that information into the proper address of the proper one of each of two initialized RAM's. The information about transitions which is inserted into random access memory at certain addresses, corresponding to pixels, at which such transitions occur is called transition-encoded information.

In the approach to image generation of the present and related inventions, the transition-encoded information within the two RAMs—RAM1 and RAM2—will be dumped simultaneously sequentially during the printing of each scan line. The dumping will start when the start of scan (SOS) signal from the marker system, e.g. from a laser scanner, indicates the beginning of a scan line.

An address counter supplies the address for both RAMs, and this counter counts sequentially at the pixel clock rate. As a somewhat simplified explanation of the process of generating an image scan line, every time the RAM1 outputs a zero, a flip-flop is toggled to "black". Every time the RAM2 outputs a zero, the same flip-flop is toggled to "white". This simplified explanation is sufficient for understanding the basic process of converting from transition-encoded information to control of the white and black generation of pixels upon a scan line. The control of the marker responsive to the example flags stored in RAM1 and RAM2 is illustrated as line BLACK/WHITE shown in FIG. 1.

The image generation approach of the present and related inventions, which approach is based on transition-encoded information, has been outlined above. However, further sophistication appears in the actual best mode implementation of the approach in a high performance image generator. For example, consider in light of the above simplified discussion of the approach that if it is attempted to twice identify a single given pixel as representing an "on" transition—such as might reasonably occur for two overlapping character fonts—and then identify each of two separate other pixels as representing "off" transitions, then an error will occur. Mainly, the marker has been turned "on" but once while being turned "off" twice. Thus, in the simplification, it is possible to have overlapping characters; but only to an extent. "On" transitions must not coincide, and "off" transitions must not coincide. This restriction is a limit which makes the simplified scheme different than a full bit-mapped scheme.

A block diagram generally showing the hardware environment—a complete image generator—of a preferred embodiment of the present invention for particular use in a laser printer, and particularly showing this preferred embodiment of the present invention as a HARDWARE PROCESSOR, is shown in FIG. 2. The entire image generator block diagrammed in FIG. 2 converts ASCII character information into pixel by pixel control of a raster scanning laser printer. The image generator is managed by two microprocessors, nominally including a first microprocessor uP1 210 type 68000 controlling external communications to and from a computer or the like, handshakes with the printer engine, and the placing of data within the font memory RAM/FONT BOARD 300. A second microprocessor uP2 220 type 68000 interacts with the same font memory RAM/FONT BOARD 300 to move certain initial data to the HARDWARE PROCESSOR 100 in response to a print command. This certain data, which is in the nature of the vertical and horizontal position at which printing is to transpire and the first address of a font which is to be printed from the location of this upper left-hand corner pixel, will be more completely discussed in conjunction with upcoming FIGS. 3 and 4. The second microprocessor uP2 does not do the decompression of run-length-encoded data into the transition-encoded data which is used to control the black/white transitions of the print engine. Rather, it just "kicks off" each font which is to be printed, and where (including in overlapping position) the font is to be so printed, and then the HARDWARE PROCESSOR in accordance with the present invention will attend to all necessary control of the laser marker of the printer.

The exact sequence of "feeding" run-length-encoded font information, and positional information, to the HARDWARE PROCESSOR 100 could be accomplished in diverse ways. One way is to store a most condensed run-length-encoded form of font information in the FONT PROMS 310 part of the RAM/FONT BOARD 300, or, alternatively and additionally, upon a hard disk which is accessed through HARD DISK CONTROLLER BOARD 400. In accordance with the font size, or scaling, received from the computer HOST via the 2 UARTS, 1 PARALLEL PORT 500 the first microprocessor uP1 210 expands the run-length-encoded information (still as run-length-encoded information, now scaled) and emplaces it in the dynamic RAM of the SOURCE FILE, part of the RAM within the RAM/FONT BOARD 300. The first microprocessor uP1 in response to input commands also assembles a complete PAGE TO BE PRINTED FILES 320, part of the RAM/FONT BOARD 300 which contains a page image entirely in (appropriately scaled) run-length-encoded information. This is a modest amount of work, but a large and highly time contrained task remains in controlling the black/white state of the print engine marker to image this information during high speed scan lines of approximately 10,320 pixels each during a scan time period of approximately 1100 microseconds. This task is initiated by the second microprocessor uP2 220 which reads the PAGE TO BE PRINTED FILES 320 and, responsively thereto, places information regarding which character and which font (i.e., what starting address within the FONT PROMS 310), horizontal position, and vertical position within the HARDWARE PROCESSOR 100. The HARDWARE PROCESSOR 100 takes this initial information, basically in the nature of commands or directives, and uses it to extract appropriate compressed font run-length-encoded information from the dynamic RAM of the RUN LENGTH FILES 321, and to assemble the "on" and "off" transition addresses of the transition-encoded information. From this transition-encoded information the RUN LENGTH TO PIXEL GENERATOR 110, which is more completely explained in companion U.S. paten application Ser. No. 096,960, will control the LASER of the print ENGINE to turn it "on" and "off", producing respective white and black imagery "on the fly".

Before discussing (in conjunction with FIG. 4) the actual hardware of the HARDWARE PROCESSOR 100 (previously shown in FIG. 2) which performs the decompression of run-length-encoded information to transition-encoded information, it is useful to better understand the theory of this transformation. Accordingly, a functional block diagram of the decompression in accordance with the present invention is shown in FIG. 3.

Figure 3:
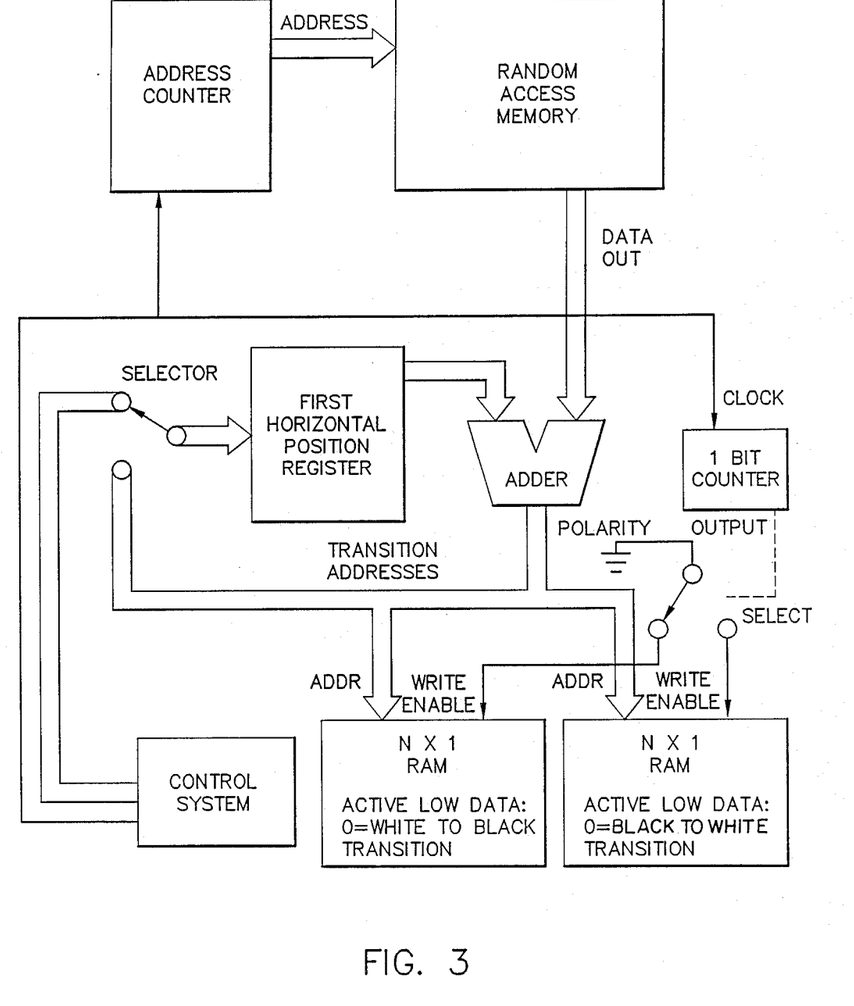
FIG. 3 shows a functional block diagram of the present invention for decompressing run-length-encoded font information to transition-encoded font information.
Figure 4A:
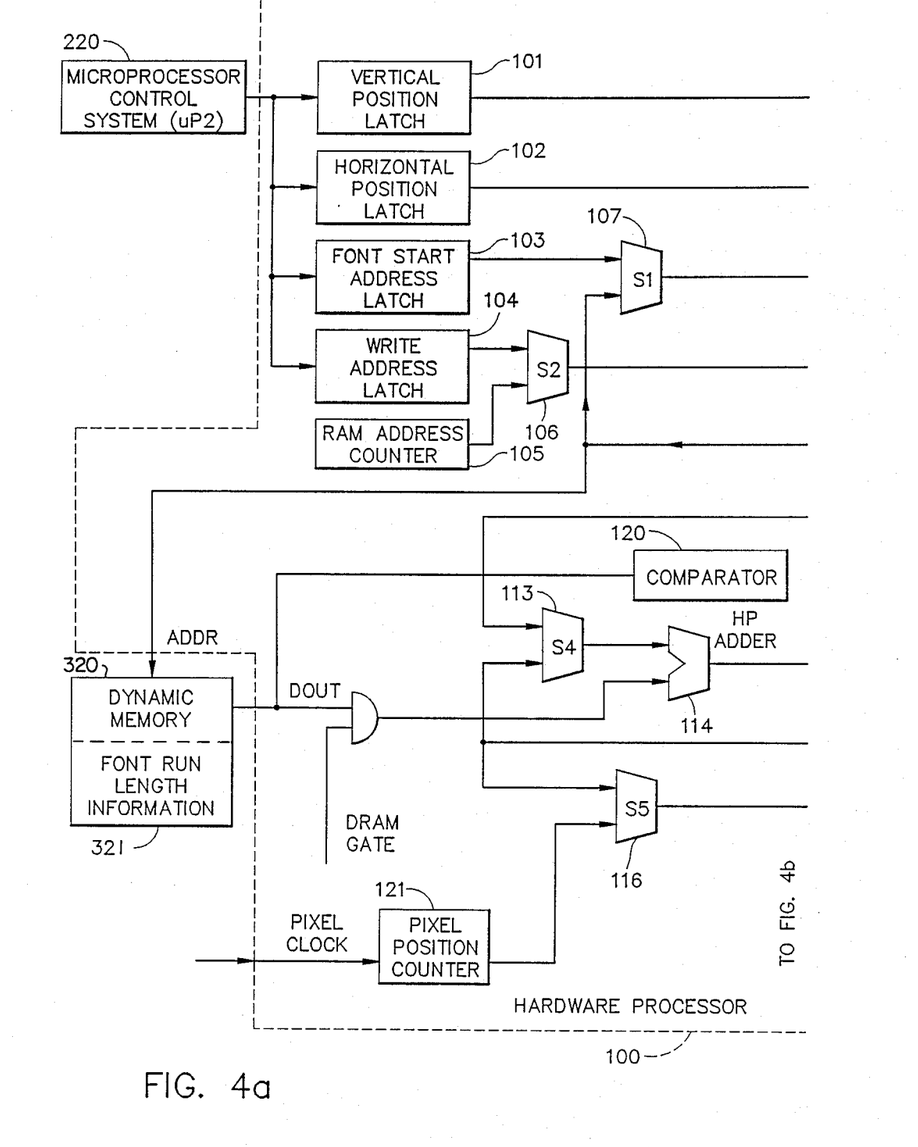
FIGS. 4a and 4b (hereafter referred to as "FIG. 4") show a hardware block diagram of the present invention for decompressing run-length-encoded font information to transition-encoded font information.
Figure 4B:
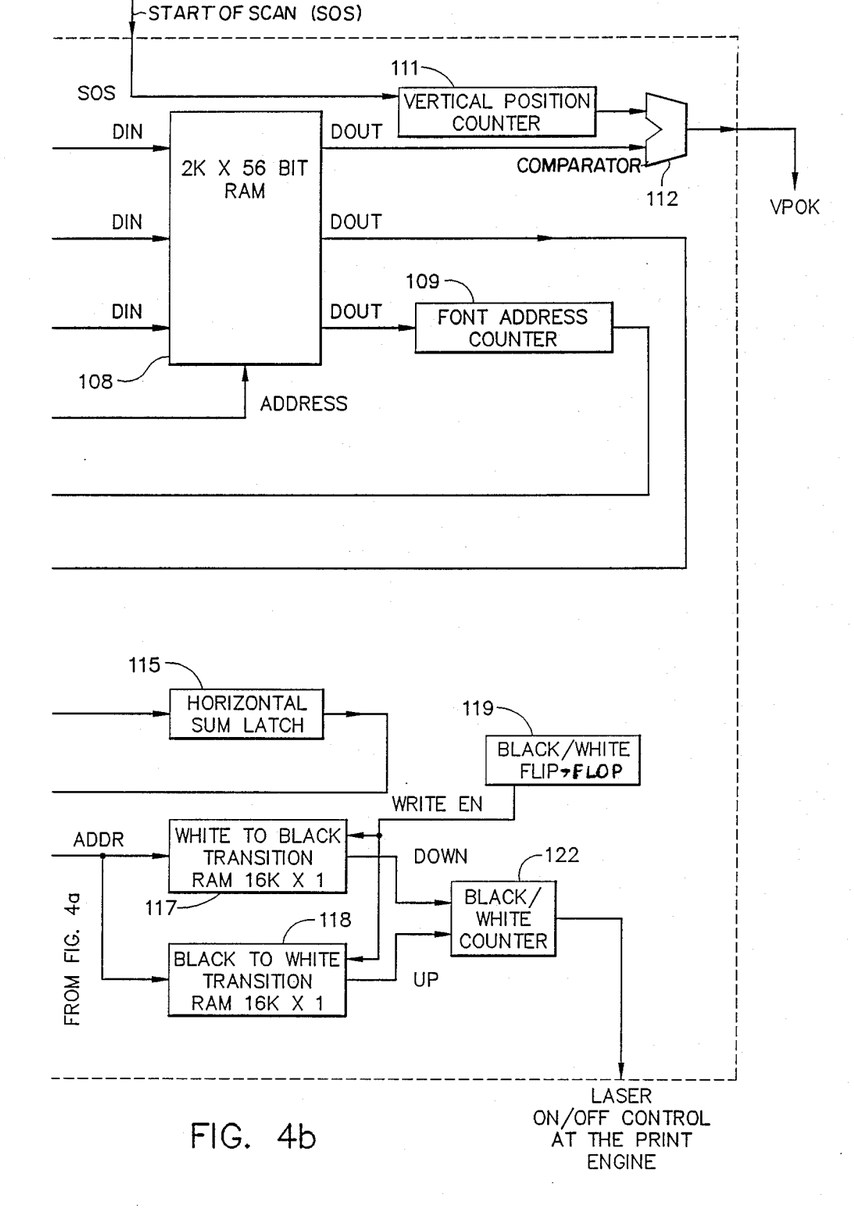

Within the block diagram of FIG. 3 which is functional, and not of hardware (although correspondence to certain hardware elements previously seen in FIG. 2 and upcoming in FIG. 4 may be generally noted), a CONTROL SYSTEM places the horizontal position of the start of a character in the FIRST HORIZONTAL POSITION REGISTER, and it places the first RAM location where appropriate compressed run length information regarding that character will be in an ADDRESS COUNTER. (Because the CONTROL SYSTEM can astutely be identified to have correspondence to the second microprocessor uP2 220, and since the RAM location is within the PAGE TO BE PRINTED FILES 320 which are both shown in FIG. 2, there is a natural tendency to try to commence looking at FIG. 3 as a hardware block diagram. This tendency is regrettably reinforced because words like "COUNTER", "MEMORY", REGISTER", and "ADDER" appearing in FIG. 3 have meanings associated with hardware elements as well as with function. However, it is better that the hardware, which exhibits the complex paths to be further shown in FIG. 4, should be placed in the background for the moment and that the transformation function which is diagrammed in FIG. 3 should first be understood. Forbearing this functional understanding, the actual hardware elements and their interconnections are likely to prove confusing.)

Using that address information, the RANDOM ACCESS MEMORY produces data indicating the number of pixels interval between the left edge of the character box and the first transition (e.g. white to black). That information is combined with the initial position information in an ADDER in order to obtain a TRANSITION ADDRESS. This transition ADDRESS is fed back into the FIRST HORIZONTAL POSITION REGISTER and latched. Meanwhile, the CONTROL SYSTEM produces a pulse which is counted by the ADDRESS COUNTER, causing that the next location in RAM is accessed. This results in a second TRANSITION ADDRESS wherein another transition is located, e.g. black to white. With each count by the address counter, a one-bit counter or FLIP-FLOP toggles to indicate a reversed polarity of transition occurring on alternate transition addresses. This continues until the last transition for that character has been produced. The control system senses a stop bit being produced by the RAM at the last transition in each line. Moreover, the control system senses a stop code at the end of the character. The transition addresses are also supplied as addresses to each of two 16K×1 RAMs, and the output of the previously mentioned FLIP-FLOP causes 0's to be stored alternately in the first, and in the second, 16K×1 RAM. The end result is that the each 16K×1 RAM contains transition information.

When the information is completed for a first character, the process is then repeated for each character on each line. When each character is completed, the contents of the ADDRESS COUNTER are saved, so that at a corresponding point on the next scan line the address counter, and resultant RAM addressing, will start where it had previously left off.

A hardware block diagram of preferred embodiment of a HARDWARE PROCESSOR 100 (previously seen in FIG. 2) in accordance with the present invention, and for decompressing, or transforming, run-length-encoded information into transition-encoded information, is shown in FIG. 4. The MICROPROCESSOR CONTROL SYSTEM uP2 220 loads information for vertical position (16 bits), horizontal position (16 bits) and font start address (24 bits), respectively into the VERTICAL POSITION LATCH 101, the HORIZONTAL POSITION LATCH 102, and the FONT START ADDRESS LATCH 103. It then picks an address location which is known to be available, and loads that information in the WRITE ADDRESS LATCH 104. A automatic sequence causes the aforementioned 56 bits of information to be loaded into one address of the 2K×56 BIT RAM 108. During this process, selector S2 106 is set to convey information from the WRITE ADDRESS LATCH 104 to the address input of the 2K×56 BIT RAM 108. At all other times selector S2 106 is set to convey the RAM ADDRESS COUNTER 105 information to the 2K×56 BIT RAM 108 address input. Moreover, during this time selector S1 107 is set to convey information from the FONT START ADDRESS LATCH 103 to the 2K×56 BIT RAM 108. Writing to this RAM 108 occurs by cycle stealing, i.e. all other processes which might be operating are interrupted for one clock cycle in order to permit writing information into this RAM 108.

The information that has been loaded into the RAM 108 is the (x,y) position on the page whereat an upper left corner of a font is to be generated, together with the address, in the DYNAMIC MEMORY 320/FONT RUN LENGTH INFORMATION 321, of where that particular font begins to be described in (previously appropriately scaled) run-length-encoded information. The DYNAMIC MEMORY 320/FONT RUN LENGTH INFORMATION 321 was previously called the PAGE TO BE PRINTED FILES 320 and the RUN LENGTH FILES 321, in FIG. 2.

Once for every scan line in a raster scanned image generating system, the RAM ADDRESS COUNTER 105 is caused to sequence through all addresses of the 2K×56 BIT RAM 108, which will permit the processing of every character's information which is resident there. Up to 2K characters which have some part of such character falling anywhere upon a given scan line may thus be represented. Normally the number of characters which might fall on a given scan line is less than 1/10 of 2K, and may typically be as few as the number of alphanumeric characters which are typically within a single print line. Immediately, however, it is obvious that the decompression and the resultant image generation in accordance with the present invention is well able to take in stride very numerous and correspondingly narrow (less than an average of 6 dots wide at 1200 dpi) characters or, as is more commonly the case, overlapped and multiply overlapped and densely multiply overlapped characters.

Once for every sweep of a scan line, a SOS (start of scan) signal is generated. In a laser print engine scanning a laser beam by an oscillating or by a rotating mirror, this SOS signal might typically be generated responsively to the mirror position. This SOS signal causes the VERTICAL POSITION COUNTER 111 to increment. This COUNTER 111 refers to the current vertical position on a page of the scanning beam. The vertical position of a given character to be potentially printed (for which certain information is contained within the RAM 108) is, during each scan cycle when all information is checked, compared with the VERTICAL POSITION COUNTER 111 in comparator 112. If the vertical position on the page whereat a character is to be printed is advanced further down the page than that position where the scanning beam currently is, then the VPOK (for Vertical Position OK) signal is taken by the control system to inhibit any action for that character or RAM position.

Once the VPOK signal indicates, for a given character, that that character's vertical position is at or in arrears of the current vertical position of the scanning beam, then the control system causes information for that character to be processed. The information is processed in the following three steps, or cycles, plus a fourth step if an end code is seen.

In a first step, the 2K×56 BIT RAM 108 is read, causing the FONT ADDRESS COUNTER 109 to be loaded with a font address. Moreover, selector S4 113 conveys the horizontal position information from RAM 108 to the HP ADDER 114. The DRAM GATE signal is low, so that this gated horizontal position information is added to zero, and is then stored unchanged in the HORIZONTAL SUM LATCH 115.

In a second step the FONT ADDRESS COUNTER 109 provides address information to the DYNAMIC MEMORY 320, which contains run-length-encoded font information. The resulting Dout (data out) read from the DYNAMIC MEMORY 320 is gated to the HP ADDER 114, with the DRAM GATE signal being now high. At this time selector S4 113 acts to convey information from the output of the HORIZONTAL SUM LATCH 115 to the upper input of this HP ADDER 114. This makes that at the conclusion of the step, or cycle, when the output of the HP ADDER 114 is latched, then the HORIZONTAL SUM LATCH 115 will contain the sum of the original horizontal position (obtained from the 2K×56 BIT RAM 108) and the offset to the first transition (obtained from the DYNAMIC MEMORY 320). When the information is valid, then selector S5 116 will act to gate this information as signal ADDR to select an address in each of the two transition memories, namely the WHITE TO BLACK TRANSITION RAM 16K×1 117, and the BLACK TO WHITE TRANSITION RAM 16K×1 118. The BLACK/WHITE FLIP-FLOP 119 is initialized to a state which permits this address information to be relevant to and used by the WHITE TO BLACK TRANSITION RAM 16×1 117, but not to or by the BLACK TO WHITE TRANSITION RAM 16K×1 118. A single-bit "transition occurs here" record is then stored in the former of the two RAMs 117,118. This record, or flag, is the beginning assembly of transition-encoded information. At the conclusion of this second cycle, the FONT ADDRESS COUNTER 109 is incremented.

The next, third, step or cycle is quite similar to the second step above, except for the following two occurrences. First, the BLACK/WHITE FLIP-FLOP 119 is now toggled so as to make the BLACK TO WHITE TRANSITION RAM 16K×1 118 record the information which is generated, instead of the WHITE TO BLACK TRANSITION RAM 16K×1 117. Second, the HORIZONTAL SUM LATCH 115 records the sum of the previous information, plus whatever offset is presented from the DYNAMIC MEMORY 320.

At the conclusion of this third step, the COMPARATOR 120 checks the most significant bit (which is not used by the HP ADDER 114 when the BLACK/WHITE FLIP-FLOP 119 is set for black/white transitions), and if that bit is high, this transition is considered to be the end of the character. If this is not the case, additional steps, or cycles, equivalent to steps two and three are repeated until such an end code is seen.

If such an end code is seen, then the following fourth step, or cycle, is then executed. The font contents of the FONT ADDRESS COUNTER 109 are written back into the 2K×56 BIT RAM 108 (with the selector S1 107 controlled to convey such information). Thus for the next scan line, the new font address information will start where the old font address information left off.

After steps one through four have been completed for a given character, then the RAM ADDR COUNTER 105 is incremented, and these four steps are repeated for each successive character until all of the potentially up to 2K characters which are potentially upon a single scan line have been processed. This processing has completely converted run-length-encoded information into transition-encoded information for a single scan line of the image generator.

The foregoing decompression, or conversion, or processing has served to record in the WHITE TO BLACK TRANSITION RAM 16K×1 117, and in the BLACK TO WHITE TRANSITION RAM 16K×1 118, the locations of the respective white-to-black and black-to-white transitions along a given scan line. Once this information has been recorded, then selector S5 116 is set to select the PIXEL POSITION COUNTER 121 to sequence through the memory locations of RAMs 117,118 in parallel, and to read the transition-encoded information stored therein. This information is read in parallel to the BLACK/WHITE COUNTER 122, and used to count down and/or count up this COUNTER 122. In the count so obtained, the most significant bit, or sign bit, is used to modulate the marker of the scanning system, or the LASER ON/OFF CONTROL AT THE PRINT ENGINE. The signal PIXEL CLOCK which feeds the PIXEL POSITION COUNTER 121 is a clock which completes one cycle for each and every advancement of the scanning beam by one horizontal pixel in distance. This counter 121 is reset at the beginning of each scan line.

The COMPARATOR 120, when sensing information from the DYNAMIC MEMORY 320, also checks for a unique code (nominally "FF") which, when seen, indicates the end of the run-length-encoded information for the entire character font. When this code is seen, then the contents of the FONT ADDRESS COUNTER 109 are changed to represent an address out of range, which address is then recorded by the 2K×56 BIT RAM 108. When this same location in RAM 108 is next interrogated, then the control system interfacing with the HARDWARE PROCESSOR will check not only for VPOK (mentioned above), but also for a font address (as supplied to DYNAMIC MEMORY 320) which is within a permissible range. If this permissible font address is not seen, then (further) image generation in response to that character is skipped. Thus characters may be skipped, or suspended from being actively used to control image generation, either because (1) their vertical position places them in a "waiting" status, or (2) their font address indicates that that character has been completely processed.

It should be noted that there are two types of stop codes for each font character. The first code suspends the reading of information for a given scan line, to be resumed on the next scan line. This code is a high, most significant, bit on the black duration information bytes (not being continuation bytes). The second code, as mentioned above, suspends information about the entire character.

Because of this detection of font addresses out of range, the second microprocessor uP2 220 (shown in FIG. 2) knows which locations in the 2K×56 BIT RAM 108 will have information which is no longer required, and thus information for new characters to be subsequently printed may be loaded in those locations.

Not shown in the block diagram of FIG. 4, to avoid complexity, is a further check of the run-length-encoded information received from DYNAMIC MEMORY 320 to look for another unique code (nominally "FE" or "7E"), which indicates that the spacing between successive transitions is too large to be represented in just a single byte. If that is the case, then the HORIZONTAL SUM LATCH 115 sums its old information plus the unique code, but no writing of that information occurs into the white/black or black/white transition RAMs 117,118, nor does the BLACK/WHITE FLIP-FLOP alter its state. The contents of the next location read from the DYNAMIC MEMORY 320 are added in as well, and if this unique code is not again repeated in that location, a transition is recorded.

I claim:

1. A method, performed in an image generating device, of decompressing information of
   (i) a horizontal (x) starting position in a scan line whereat a font image is to begin being displayed, and
   (ii) an initial address in a font memory whereat begins run-length-encoded information describing the font image which is to be displayed, into information of
      (a) all pixel points in the scan line whereat occurs a black to white transition in the font image, and
      (b) all pixel points in the scan line whereat occurs a white to black transition in the font image, said method comprising:
   providing a horizontal (x) starting position in a scan line whereat a font image is to begin being displayed as a first data input to an adder;
   successively reading run-length-encoded information describing the font image from a font memory, beginning at an initial address and continuing at successive addresses until all of the run-length-encoded information describing the font image for the scan line has been read;
   providing the successively read run-length-encoded information as successive second data inputs to the adder;
   successively recursively adding in the adder, starting with the first data input and a first one of the second data inputs, the successive second data inputs to produce successive horizontal transition addresses; and
   alternately storing in a black-to-white transition memory and in a white-to-black transition memory a flag at each of the successive horizontal transition addresses;
   wherein the flags in the black-to-white transition memory indicate all pixel points in the scan line whereat occurs a black to white transition in displaying the font image; and
   wherein the flags in the white-to-black transition memory indicate all pixel points in the scan line whereat occurs a white to black transition in displaying the font image.

2. The method according to claim 1 wherein the alternate storing is controlled by setting a flip-flop to one state when storing a flag in the black-to-white transition memory and to another state when storing a flag in the white-to-black transition memory.

3. The method according to claim 1 further expanded for decompressing the information of
   (iii) a vertical (y) starting scan line whereat the font image is to begin being displayed,
      said expanded method in accordance with claim 1, in additional steps before said first step of providing, further comprising: storing in an image line memory the horizontal (x) starting position and the vertical (y) starting scan line whereat the font image is to begin being displayed, together with the initial address in the font memory whereat the font image begins to be described as run-length-encoded information;
   retrieving at the time of each successive scan line of the image-generating device, which scan line contributes to an entire image generated by the image-generating device the x and y data stored within the image line memory; and
   comparing the vertical (y) starting scan line retrieved from the image line memory to the current vertical scan line of the image-generating device, and IF the current vertical scan line is equal to or greater than the retrieved vertical (y) starting scan line THEN providing the horizontal (x) starting position retrieved from the image line memory to the adder as the horizontal (x) starting position and continuing with said step of successively reading ELSE IF the current vertical scan line is less than the retrieved vertical (y) starting scan line THEN continuing with said step of retrieving.

4. The method according to claim 3 wherein said step of successively reading further comprises:
   reading an end-of-font-in-a-one-scan-line control bit from the font memory whenever there is no additional run-length-encoded information for the font image at the present vertical scan line; and wherein the method further comprises:
   storing at such times as the control bit is read from the first memory the next address from that address at which the control bit was read in the image line memory as a new initial address.

5. The method according to claim 4 which, after said step of successively retrieving, further comprises:
   determining if the retrieved initial address is within a permissible range and IF it is within a permissible range THEN proceeding with said step of comparing ELSE IF it is not within a permissible range THEN continuing with said step of successively reading.

6. A conversion circuit apparatus, used in an image generating device, for decompressing run-length-encoded font image information into transition-encoded font image information;

which run-length-encoded font image information is in the form of a number x of pixels until a first, nominal white-to-black, transition followed by a number y of pixels until a next, black-to-white, transition followed by a number z of pixels to a next, white-to-black, transition and so on, all of the numbers collectively representing the image of a particular character in a particular font for a single scan line, one of many scan lines which in aggregate form the image of the entire character in the particular font; and which transition-encoded information is in the form of first-type flags demarcating the absolute displacement positions of all pixels in the single scan line wherein a first, nominal white-to-black, transition occurs, plus second-type flags demarcating the absolute displacement positions of all pixels in the single scan line wherein a second, black-to-white, transition occurs, with neither type flag if neither transition occurs, for each pixel in the single scan line; the conversion circuit apparatus comprising:

a horizontal position register for holding and for outputting during each of a plurality of iterative cycles a pixel displacement quantity, wherein the initial pixel displacement quantity held and outputted is the position of a pixel in a scan line whereat a character font image is to begin being generated;

a first memory for holding and for outputting during each of the plurality of iterative cycles a successive pixel displacement number bearing run-length-encoded information regarding the character font image which is to be generated;

an adder, for receiving on each of the iterative cycles the pixel displacement quantity from the register and the pixel displacement number from the first memory and for forming therefrom a sum displacement quantity which sum displacement quantity represents the absolute displacement position of a pixel in the scan line wherein a white-to-black, or a black-to-white, transition occurs in the character font image;

a second memory having a multiplicity of addresses corresponding to the absolute displacement positions of a multiplicity of pixels in the scan line;

toggling flagging means, responsive to the sum displacement quantities formed by the adder for emplacing, during alternate ones of the plurality of iterative cycles, a first-type, white-to-black, transition flag and a second-type, black-to-white, transition flag at the address of the second memory which corresponds to the sum displacement quantity formed by the adder during the corresponding one of the plurality of iterative cycles; and gating means for storing the sum displacement quantity formed by the adder in the register to be held therein as the pixel displacement quantity to be provided during the next iterative cycle.

7. The apparatus according to claim 6 wherein the toggling flagging means comprises:

a flip-flop which is toggled between two alternate states during each of the plurality of iterative cycles.

8. An image generating apparatus controlling in real time a marker thereof during the marker's writing of a multiplicity of pixels in a single scan line in response to an informational encoding of marker-control, which informational encoding is called transition-encoded information, the image generating apparatus which uses transition-encoded information for marker control CHARACTERIZED IN THAT a memory, having a multiplicity of addresses corresponding to the multiplicity of pixels in the single scan line, holds in each address (i) a first-type flag indicating a white-to-black transition of the marker, (ii) a second-type flag indicating a black-to-white transition of the marker, or (iii) a null flag indicating no transition of the marker, wherein the type of flag held in each address, and the particular addresses at which the flags are held, are both in correspondence to the pixels of that portion of a black and white image which is in the single scan line, wherein the collective flags at the collective addresses constitute transition-encoded information.

9. The image generating apparatus which uses transition-encoded information for marker control according to claim 8 FURTHER CHARACTERIZED IN THAT the marker is controlled directly by the transition-encoded information, meaning that there is no additional or intervening informational encoding of the transition-encoded information which is constituted by the collective flags held in the memory at the collective addresses of the memory before the use of this information for black/white control of the marker.

10. The image generating apparatus which uses transition-encoded information for marker control according to claim 8 FURTHER CHARACTERIZED IN THAT run-length-encoded image information is decompressed into the transition-encoded information which is held in the memory as the flags at the addresses of the memory;

wherein the run-length-encoded image information is an informational encoding of the form of a number x of pixels until a first, nominal white-to-black, transition followed by a number y of pixels until an opposite next, black-to-white, transition followed by a number z of pixels until a next transition, and so on, which numbers collectively represent the portion of an image which is in the single scan line;

wherein because the run-length-encoded information representing the image portion is more concise than the transition-encoded information representing the same image portion, a conversion of the run-length-encoded information into the transition-encoded information is called a decompression.

11. The image generating apparatus which uses transition-encoded information for marker control according to claim 10 FURTHER CHARACTERIZED IN THAT a pixel positional offset along the single scan line may be incorporated within the transition-encoded information during its decompression from the run-length-encoded information, the incorporation making that the run-length-encoded information and the transition-encoded information each represent the same image portion but displace this image portion differently from each other along the single scan line.

12. The image generating apparatus which uses transition-encoded information for marker control according to claim 8 FURTHER CHARACTERIZED IN THAT the memory is divided into two parallel memories each having the entire multiplicity of addresses: a first, white-to-black, transition memory holding only first-type flags and null flags, and a second, black-to-white, transition memory holding only second-type flags and null flags.

13. The image generating apparatus which uses transition-encoded information for marker control according to claim 8 FURTHER CHARACTERIZED IN THAT the marker is a laser beam.

* * * * *